May 26, 1953  Z. L. COLLINS ET AL  2,640,160
EXPOSURE MONITOR FOR HORIZONTAL CASSETTE CHANGER
Filed Nov. 21, 1950  3 Sheets-Sheet 1

INVENTORS
Z. L. COLLINS,
F. J. EULER, Jr.
BY
ATTORNEY

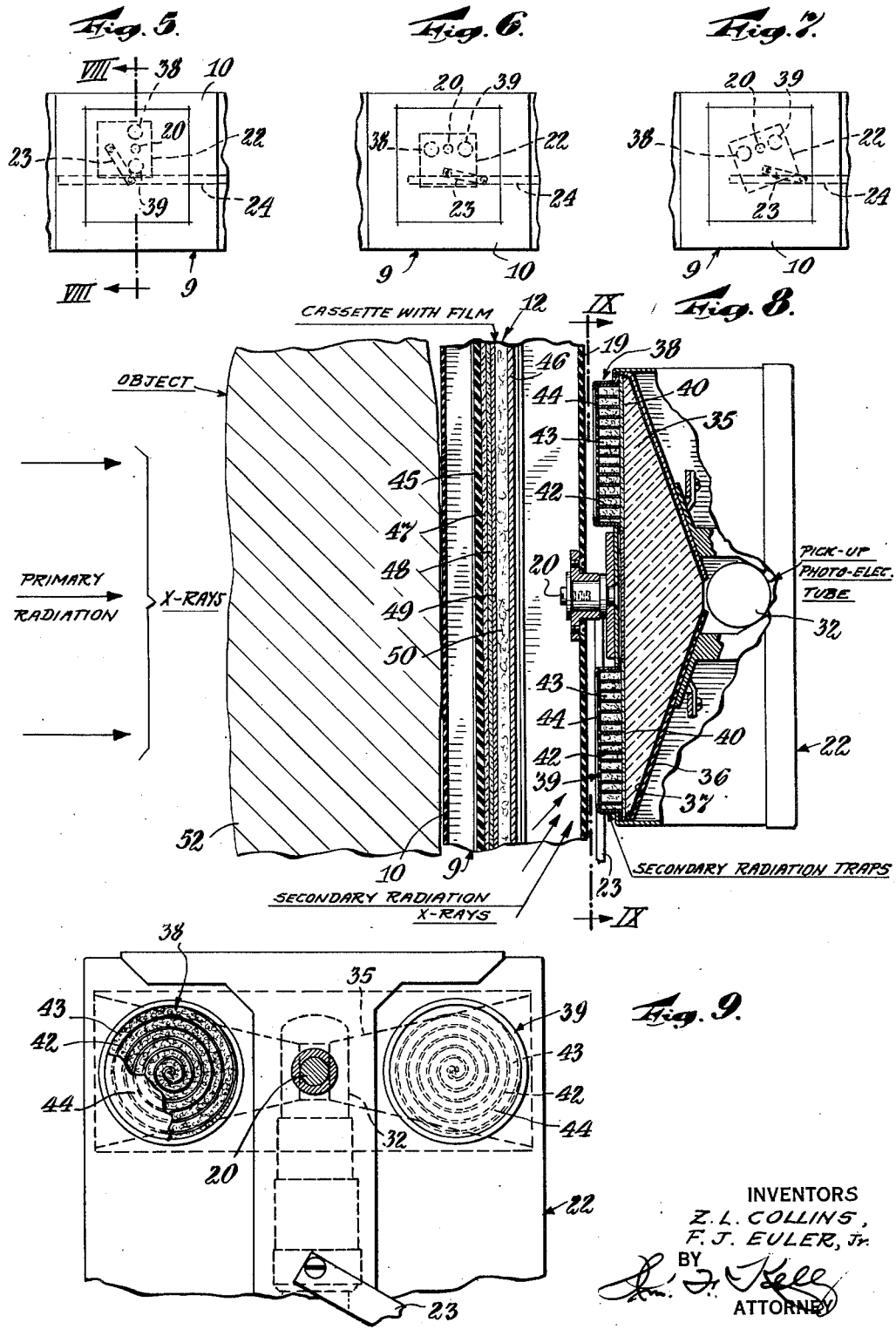

INVENTORS
Z.L. COLLINS,
F.J. EULER, Jr.
BY
ATTORNEY

Patented May 26, 1953

2,640,160

UNITED STATES PATENT OFFICE 2,640,160

EXPOSURE MONITOR FOR HORIZONTAL CASSETTE CHANGER

Zane L. Collins, Linthicum Heights, and Frederick J. Euler, Jr., Baltimore, Md., assignors to Westinghouse Electric Corporation, East Pittsburgh, Pa., a corporation of Pennsylvania Application November 21, 1950, Serial No. 196,756

5 Claims. (Cl. 250—66)

The present invention relates to X-ray apparatus and more particularly to an exposure monitor for horizontal cassette changers.

Apparatus of this general type has long been known to the art and is utilized in connection with the making of a radiographic examination, so that the roentgenologist may operate the apparatus to position the film in the path of the X-ray beam after it has passed through a patient or object, and immediately thereafter move the exposed film out of the path of the X-ray beam and a new unexposed film into the path of such beam, preparatory to the making of another exposure. An apparatus of this type is shown and claimed in Patent No. 1,916,383, granted July 4, 1933, to Montford Morrison and assigned to the same assignee as the present invention.

For a considerably long period in the art, this apparatus was subject to numerous disadvantages. In the first place, there previously was no way in which a constant density of the image could be assured, since the intensity of the radiations impinging upon the photographic film varies with patient thickness and fluctuations in milliampere-seconds of exposure. Comparatively recent developments have eliminated some of these previous disadvantages by attempting to automatically time the exposure by means of phototiming. Even these latter systems have likewise been subject to inherent defects because they did not take into consideration the variation in film density resulting from changes in kilovoltage settings. Moreover, such phototiming systems have failed to compensate for radiation absorption by the film-holding cassette, intensifying screens and the like, normally employed in the making of a radiographic exposure, and they have failed to take into consideration the secondary radiation resulting from the passage of the primary X-ray beam through the object and the cassette.

It is accordingly an object of the present invention to provide an exposure monitor for cassette changers which is exceedingly accurate in phototiming an exposure, thus assuring uniformity in film density under all variable conditions of difference in patient thickness and changes in kilovoltage settings.

Another object of the present invention is the provision of an exposure monitor for cassette changers which is exceedingly accurate in automatically terminating an X-ray exposure when the density of the film reaches a desired value.

Another object of the present invention is the provision of an exposure monitor for cassette changers wherein the exposure is photo-timed with all secondary radiation being prevented from affecting the response of the phototimer so that the latter is operated entirely by the primary X-ray beam, thus assuring accurate and duplicatable results.

A further object of the present invention is the provision of an exposure monitor for cassette changers wherein a scanner head is utilized which enables radiography over a relatively broad range of techniques while assuring constancy in film density.

Still further objects of the present invention will become obvious to those skilled in the art by reference to the accompanying drawings wherein:

Fig. 5 shows the relative position of the scanner head when the control lever is set at 1 or the "Skull Cervical Spine," position indicated on the scale of Fig. 4;

Fig. 6 is a view similar to Fig. 5, but showing the position of the scanner head when the control lever is moved to 3 or the "Shoulder" position indicated on the scale of Fig. 4;

Fig. 7 is a view similar to Fig. 5, but showing the position of the scanner head when the control lever is moved to 4 or the "AP Chest R Lat—R Obl." position indicated on the scale of Fig. 4, which position of the scanner head is just opposite to that as shown in Fig. 1;

Fig. 8 is a sectional view on an enlarged scale taken on the line VIII—VIII of Fig. 5 and looking in the direction indicated by the arrows;

Fig. 9 is a sectional view taken on the line IX—IX of Fig. 8, but showing the scanner head in the position illustrated in Fig. 6;

Figure 10:
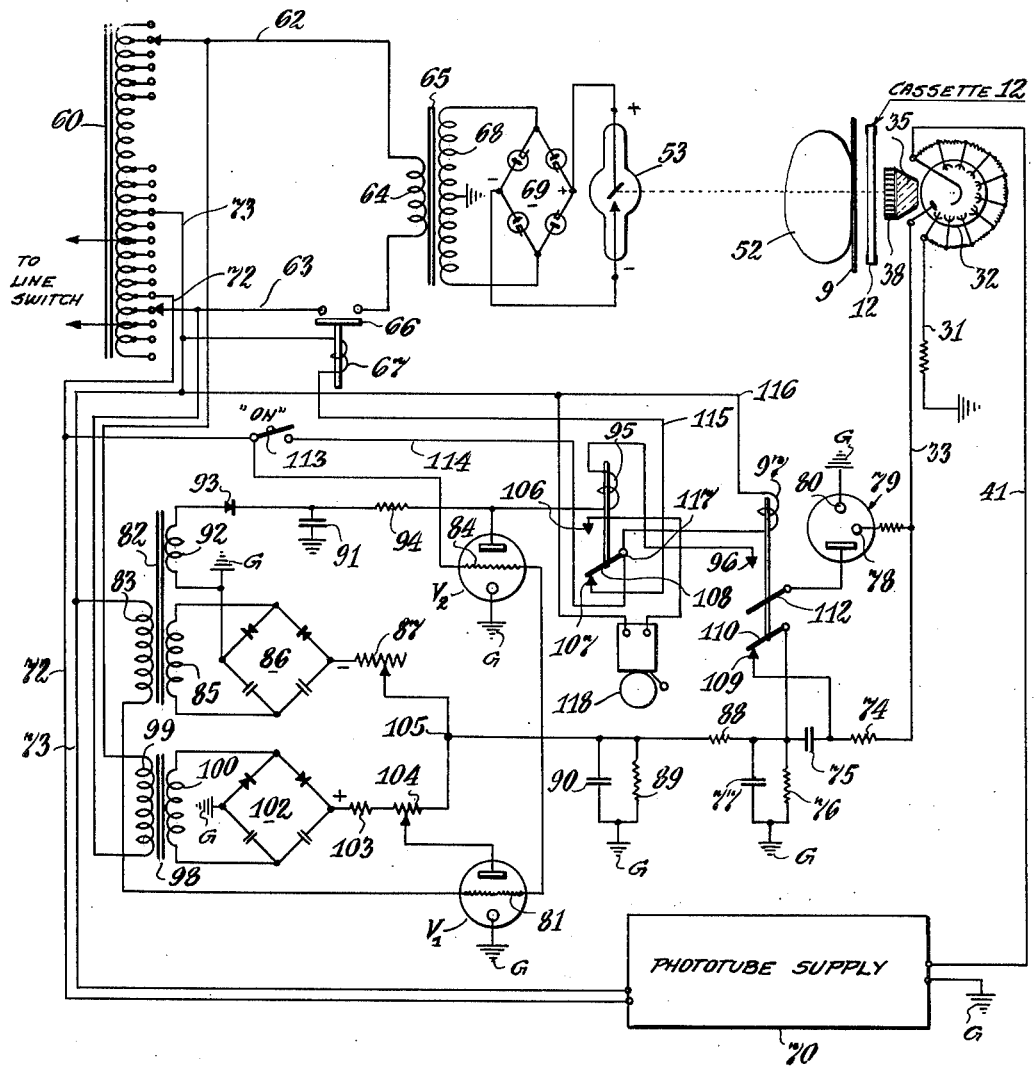
Figure 11:
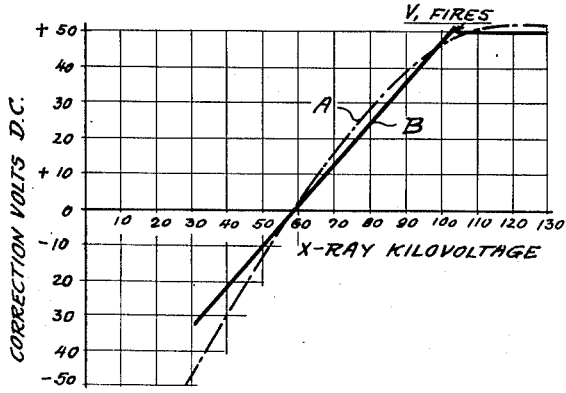

Fig. 10 is a diagrammatic illustration of the electrical system of the exposure monitor of the present invention; and Fig. 11 is a graphic illustration showing the relationship between kilovoltage and a correction voltage with the latter varying with changes in kilovoltage substantially in accordance with the absorption curve of the cassette and its contents and wherein the abscissa represents the kilovoltage applied to the X-ray tube and the ordinate represents correction voltage applied to a control tube.

Figure 1:
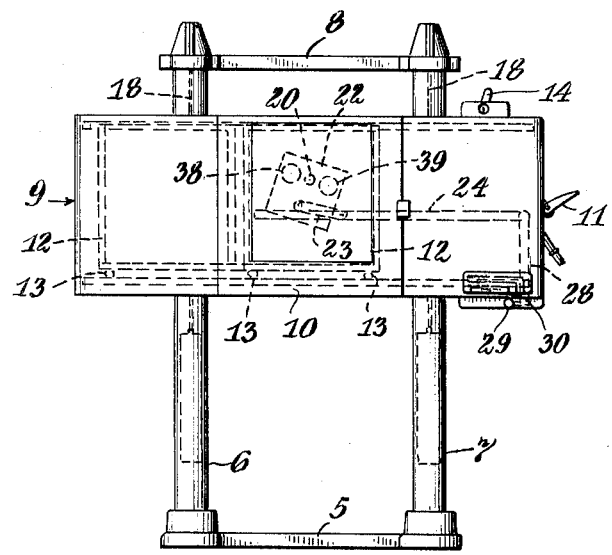
Fig. 1 is a front elevational view of a cassette changer with which the exposure monitor of the present invention is employed and showing the position of the scanner head when the control lever is moved to 2, or "PA Chest—L Lat—L Obl," position as shown on the scale of Fig. 4.
Figure 2:
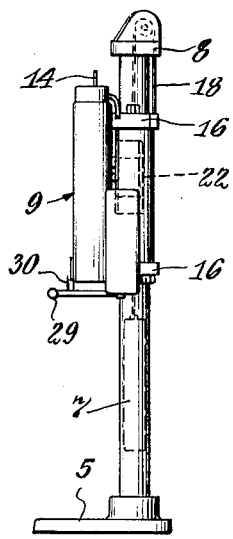
Fig. 2 is a side elevational view looking to the left of the cassette changer of Fig. 1.

Referring now to the drawings in detail, there is shown in Fig. 1 a horizontal cassette changer to which the exposure monitor of the present invention is applied. Such cassette changer comprises a base 5 provided with a pair of standards or uprights 6 and 7 which are tied together near their upper ends by a cross-bar 8. Suspended across the front of these uprights is a casing 9 divided into three sections, the two end sections of which are impervious to X-rays by being lined with lead or the like, the center section carrying a door 10 is pervious to X-rays. The interior of this casing 9 is provided with a cassette 12, which has a width approximating that of two of the casing sections, and is mounted on rollers or the like 13 for longitudinal movement interiorly of the casing 9, by cocking in a desired position by a lever 11 and releasing from such position by operation of a tripping lever 14, in the customary manner and as shown and described, for example, in the above mentioned U. S. Patent No. 1,916,383.

Figure 3:
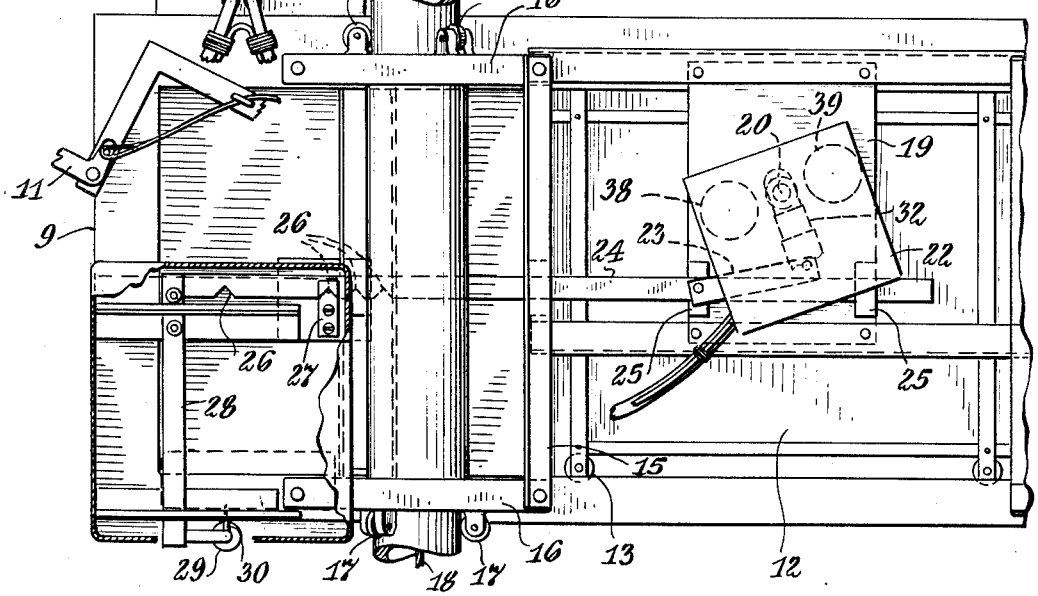
Fig. 3 is a fragmentary view partly in section and on an enlarged scale of the rear of the cassette changer as shown in Fig. 1.

By reference more particularly to Fig. 3, it will be noted that the casing 9 is supported by a frame-work 15 extending between the uprights 6 and 7 which carries a pair of collars 16 at each end surrounding the uprights and such collars are provided with rollers 17 riding on the uprights to allow vertical movement of the casing 9. The uprights contain counterweights interiorly thereof which are connected to the casing 9 by a chain or cable 18 passing over suitable pulleys secured to the top of the uprights, for the purpose of counterbalancing the casing 9 in all its various vertical positions relative to the uprights. Rigidly secured to the frame 15 is an X-ray pervious plate 19, which may be of a phenolic condensation product or the like, and pivotally connected thereto at 20 is a small X-ray impervious housing 22 of lead or similar material. In order to partially rotate this housing 22 about its pivot 20, a link 23 (Fig. 3) is pivotally connected to the housing 22 and to a sliding bar 24, with this latter passing through guides 25 carried by the plate 19. It will be noted that the sliding bar 24 is provided with a plurality of notches 26 any one of which is engaged by a detent 27 as the bar is slid in a longitudinal direction. An angular extension 28 (Fig. 3) is carried at one end of the sliding bar 24 and an adjustment lever 29 provided with a pointer 30 is secured to the lower end of the extension 28.

Figure 4:
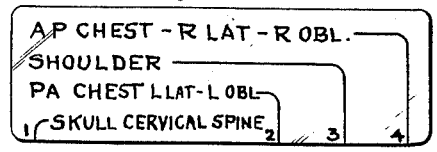
Fig. 4 is an enlarged view of the technique scale to which the scanner head control lever is set for the desired techniques.

In order to move the sliding bar 24, the operator lifts the adjustment lever 29 and moves it to the right or left, to align the pointer 30 with the desired technique index shown in Fig. 4. Lifting of such lever 29 causes upward movement of the bar extension 28 and a similar raising of the sliding bar 24, since sufficient clearance is provided in the guides 25 to allow such raising, thus disengaging the detent 27 from one of the slots 26. When the adjustment lever 29 is thus moved to the right or left, to align the pointer 30 with the desired technique index, like movement of sliding bar 24 occurs and upon setting of the pointer 30 and release of the adjustment lever 29 by the operator, the bar 24 is again lowered which causes the detent 27 to engage another one of the notches 26.

Due to the pivotal connection of the link 23 with the sliding bar 24 and the housing 22, the latter is moved about its pivot 20. For example, movement of the adjustment arm 29 to align the pointer 30 with the No. 1, or "Skull Cervical Spine" index position shown in Fig. 4, causes rotation of the housing 22 to the position as shown in Fig. 5, while movement of such lever and pointer to the No. 2 or "PA Chest L Lat—L Obl" index position causes rotation of the housing 22 to the position shown in Figs. 1 and 3. Similarly, movement of the lever 29 and pointer 30 to the No. 3 or "Shoulder" index position shown in Fig. 4 causes rotation of the housing 22 to the angular position shown in Fig. 6, while movement of the lever and pointer to the No. 4 or "AP Chest—R Lat—R Obl" index position will rotate the housing 22 to the position as shown in Fig. 7.

Referring now more specifically to Figs. 8 and 9, it will be noted that the housing 22 encases a photoelectric pick-up tube 32 together with other electrical elements hereinafter referred to in connection with Fig. 10. This phototube 32 is of the photomultiplier type and is supported within the housing 22 by suitable brackets or the like. Positioned in front of the photomultiplier pick-up tube 32 is a pyramidal light collector 35 also supported by suitable brackets and having its slightly flattened apex terminating at the photosensitive cathode window of the photomultiplier pick-up tube while its base equals approximately one-half the area of the front of the casing 22, as shown by the dotted lines in Fig. 9, and is positioned immediately in back of the latter. The pyramidal sides of the light collector 35 are covered with a lead mask 36, except at the flattened apex, to prevent the passage of X-rays through the light collector and either the contiguous surface of the latter, or that of the mask 36, is provided with a light reflecting coating 37, which may take the form of a white or metallized painting or the like. This light collector 35 may be of Lucite, quartz or similar transparent material, as is well known in the art of optics.

As shown more clearly in Figs. 8 and 9, the front of the casing 22 is provided with a pair of spaced circular secondary radiation traps 38 and 39 whose axes lie on the same plane with that of the photosensitive cathode window. These traps are formed of a base comprising a fluorescent screen 40 to which is secured a spiral of a continuous strip 42 of X-ray impervious material, such as lead or the like, and having a material pervious to X-rays, such as a phenolic condensation product, glass wool, or the like 43, disposed between the convolutions of the spirally wound strip, and this X-ray pervious material may also form a cover plate 44 for the secondary radiation traps 38 and 39 while the remainder of the front cover of the casing 22 is of an X-ray impervious material such as lead or the like. Although a continuous spiral strip 42 has been shown, it will be understood that these secondary radiation traps may also be formed of concentric alternate rings of X-ray pervious and impervious material or of rectangular configuration with similar alternate strips of X-ray pervious and impervious material, but in any event, such spirals, rings or strips are disposed with their wide dimension parallel to the direction of the primary X-ray beam. It will thus be seen that by operation of the adjustment lever 29 with rotation of the housing 22 to its various angular positions, as above mentioned, the secondary radiation traps 38 and 39 are likewise rotated to various positions, as shown in the several figures, thus placing them so that their respective fluorescent screen base 40 is responsive to selected portions of the primary X-ray beam, as hereinafter more fully explained.

As previously mentioned, the casing 9 is provided with a movable cassette 12 which, as shown more in detail in Fig. 8, comprises a cover 45 of an X-ray pervious material, such as a phenolic condensation product or the like, and an X-ray pervious back 46 of aluminum or similar material. Immediately in the back of the cover 45 is the usual thin intensifying screen 47 backed by the photosensitive film 48, then the customary thick intensifying screen 49, and next a felt cushion 50 between the thick intensifying screen and the aluminum back 46. The object 52 to be radiographed rests against the cover 10 of the casing 9 and the primary X-ray beam from an X-ray tube 53 (Fig. 10) is directed horizontally through the object 52 in the customary manner. By operation of the adjustment lever 29 the secondary radiation traps 38 and 39 are moved, as previously mentioned, to align them with desired areas of the object 52. The X-ray beam passes through the object and the X-ray pervious casing 9 and cassette cover 45, thus casting an image on the photosensitive film 48 which is intensified by the screens 47 and 49. This same primary X-ray beam will also pass through the plate 19 and secondary radiation traps 38 and 39 casting a visible image on the fluorescent screen base 40 of each trap. The visible light from the fluorescent screen bases 40 will be collected, through reflection and refraction, and thus concentrated at the slightly flattened apex of the lens-like light collector 35 adjacent the window of the photomultiplier tube 32, which latter will pass current proportional to the intensity of the light impinging on its cathode electrode.

It has, of course, been long recognized in the art that the primary X-rays in passing through an object and striking the bones and relatively solid tissue of a patient, will generate secondary X-rays. It has been found that in a system such as that of the present invention, where the density of the exposed film is controlled by the intensity of the visible light produced on a fluorescent screen, that the primary X-ray beam in passing through the casing 9, as well as the cassette 12 with its intensifying screens, also generates secondary X-radiations which would otherwise cause a pseudo-effect on the fluorescent screen base 40 of the radiation traps 38 and 39 on to which the photomultiplier tube would respond. In the absence of provisions to the contrary, the photomultiplier tube would thus pass a current proportional to the total light of the fluorescent screen which would thus represent the sum of the primary and secondary X-radiations and not that of the primary radiations alone. Moreover, it is the primary X-radiations alone which desirably effect the photosensitive screen and unless the fluorescent screen bases 40 are entirely responsive to the same primary X-radiations as is the photosensitive film, then an error is injected with the result that the light to which the photomultiplier tube 32 responds is not directly proportional to that striking the photosensitive film 48.

However, the provision of alternate strips of X-ray impervious material 42 with alternate strips of X-ray pervious material 43 and having their widest dimension parallel to the path of the primary X-ray beam, thus allows only the primary X-ray beam to pass through the radiation traps 38 and 39 to excite the fluorescent screen bases 40, with all secondary X-radiations being intercepted by the X-ray impervious strips 42, since such secondary radiation is projected angularly relative to the primary X-ray beam, as shown by the legend and arrows in Fig. 8. Accordingly, the fluorescent screen bases 40 of the radiation traps 38 and 39 are subjected to only the same primary X-ray beam as is the photosensitive film 48, and the light thus produced on these screens is directly proportional to the X-ray beam affecting the density of the exposed film, which light alone affects the photomultiplier tube 32.

Heretofore, a further disadvantage has existed in apparatus of the present general type which is eliminated by the present invention. When a light sensitive tube, such as the photomultiplier tube 32, and a fluorescent screen are used in a system for automatic timing of X-ray film in conjunction with intensifying screens in a cassette, a variation in density has heretofore been encountered in the developed films when the X-ray tube kilovoltage is varied. Such difficulty occurs due to the absorption of radiation by the cassette and its contents, especially the back screen which is quite thick and more radioopaque than the remainder of the cassette contents. This absorption has no effect at constant kilovoltage, since with varying sizes of objects, a constant amount of the penetrating radiation is subtracted by the cassette, film, etc., and the remainder affecting the rearwardly disposed fluorescent screen is still proportional to that affecting the film.

However, as kilovoltage is changed, the portion which is absorbed by the cassette and contents varies from a sizable amount at low kilovoltage to very little at high values of kilovoltage. Accordingly, with the same subject, greater film densities will be produced at low kilovolts-peak than at high kilovolts-peak because the additional absorption by the cassette and contents lowers the brilliance of the fluorescent pick-up screen, lengthening the exposure more than is required by the absorption of the subject at this kilovoltage.

By reference now more particularly to Fig. 10, the electrical system of the present invention is therein shown to correct for variation in kilovoltage settings. As is customary, an auto-transformer 60 is provided which is connected to the usual source of commercial potential of 215–230 volts upon closure of a switch, as indicated by the legend "To Line Switch." The secondary of such auto-transformer is connected by conductors 62 and 63 to the primary winding 64 of a high potential transformer 65 upon closure of the contact 66 of a relay 67, while the secondary winding 68 of transformer 65 is connected through a full-wave rectifying arrangement 69 to the X-ray tube 53.

The "photo-tube supply" 70 is connected by conductors 72 and 73 to suitable taps on the auto-transformer 60 and to the photo-multiplier tube 32 by the conductors 31 and 41. As usual in photo-tube timing of exposures, the output of the photomultiplier tube 32 is connected by a conductor 33 through a resistor 74 to a capacitor 75, the latter of which is connected to ground through a filter arrangement, comprising a parallel connected resistor 76 and capacitor 77, and thus connected to the photo-tube supply 70 through the latter's ground connection G. The control electrode 78 of an electronic tube 79 is connected to the negative plate of the capacitor 75 while the positive plate of this capacitor is connected through ground to the cathode 80 of the electronic tube 79.

For the purpose of supplying a constant voltage of selected magnitude to the control electrode 78 of the electronic discharge tube 79, a transformer 82 is provided having one end of its primary winding 83 connected through the series-connected safety interlock electrodes 81 and 84 of respective voltage regulator tubes V1 and V2 to the line conductor 72, while the remaining end of such primary winding 83 is connected to the line conductor 73. Therefore, the equipment will not operate unless V1 and V2 are in place. The secondary winding 85 of transformer 82 is connected to a full-wave voltage-doubling rectifier arrangement 86, which may comprise a bridge circuit of rectox rectifiers, with the negative output terminal of this rectifier arrangement connected through an adjustable resistance 87 and a fixed resistance 88, as well as the capacitor 75 and fixed resistor 74, to the control electrode 78 of electronic tube 79. A filter arrangement comprising a parallel connected fixed resistor 89 and capacitor 90 is disposed between this negative terminal of the rectifier arrangement 86 and ground which together with the filter arrangement 88—76—77 prevents stray pickup in the conductors due to relay operation, etc. from affecting the resultant biasing potential supplied to the control electrode 78. The positive output terminal of the rectifier arrangement 86 is connected to ground and also to one end of a tertiary winding 92 provided on the transformer 82 with the other end of such tertiary winding being connected to ground through a condenser 91 and through a rectox rectifier 93 and fixed resistance 94 to the anode of voltage regulator tube V2, as well as to one end of the winding of a relay 95 whose remaining end is connected to a contact terminal 96 of an additional relay 97.

For the purpose of supplying a positive biasing potential to the control electrode 78 of electronic tube 79, which varies proportional to the kilovolt-peak supplied to the X-ray tube 53, a transformer 98 is provided which has its primary winding 99 connected to the conductors 62 and 63 and thus to the same taps of auto-transformer 60 as the primary winding 64 of high tension transformer 65 placing the two primary windings 64 and 99 in electrical parallel. The secondary winding 100 of transformer 98 is connected to a rectifying arrangement 102 which may be identical to that of the previously described voltage-doubling rectified arrangement 86. The positive output terminal of the rectifier arrangement 102 is connected through a fixed resistor 103 and an adjustable resistor 104 to a junction 105 with the negative output from the rectifier arrangement 86, which thus enables a positive biasing potential to also be supplied to the control electrode 78 of electronic discharge tube 79. The adjustable arm of resistor 104 is connected to the anode of voltage regulator tube V1 while the cathode electrodes of both voltage regulator tubes V1 and V2 are connected to ground.

Referring now to relay 95, it will be noted that it is provided with a normally open contact terminal 106 engaged by the relay contact 108, while the relay 97, in addition to the normally open contact terminal 96, has a normally closed contact terminal 109 engaged by the relay contact 110 to short-circuit the capacitor 75 and a further relay contact 112 which is connected to the plate of electronic discharge tube 79, is provided to engage contact terminal 96 upon energization of the relay 97. When an "on" switch 113 is closed, a circuit is completed from the supply line 72 through the switch 113 and by means of a conductor 114 to the relay contact 108 engaging the contact terminal 107 and thence by means of a conductor 115 to one end of the winding of relay 67 while the remaining end of the latter is connected to the supply line 73. The winding of relay 97 is connected to the supply line through switch 113, since one end of the winding of relay 97 is connected to the supply line 73 by a conductor 116 while its remaining end is connected at a junction 117 with the conductor 114 and hence to the other supply line 72. A signal, such as a bell or the like 118, has one end connected to the conductor 116 and thus to the supply line 73 while the other side of the signal is connected to the normally open contact terminal 106.

The system of the present invention operates in the following manner:

The main line switch (not shown) is closed to energize the auto-transformer 60 which in turn energizes the transformers 82 and 98, as well as the photo-tube supply 70. The adjustable resistor 104 is usually set at the factory so that the voltage regulator tube V1 fires when the kilovolt-peak supplied to the X-ray tube 53 exceeds approximately 105 kvp. and adjustable resistor 87 is set to give the desired negative biasing voltage for the control electrode 78 of electronic discharge tube 79. This negative biasing voltage remains constant for a given kilovoltage setting, since the primary winding 83 of transformer 82 is connected to the auto-transformer 60 through an internal connection in the base of the tubes V1 and V2 so that the transformer cannot be energized unless such tubes are in place within their respective sockets. At the same time, a variable positive biasing voltage is superimposed on the negative biasing voltage supplied to the control electrode 78 of electronic discharge tube 79, which positive biasing voltage is proportional to the kilovoltage set on the auto-transformer, since the primary winding 99 of transformer 98 is connected in parallel with the primary winding 64 of high tension transformer 65.

It is, however, undesirable to have the correction biasing voltage (the resultant voltage of the combined negative and positive biasing voltages) vary directly with kilovolt-peak voltage throughout the entire range of kilovoltage settings. For this reason the adjustable resistor 104 is set about 105 kvp. and when the voltage proportional thereto is exceeded, voltage regulator tube V1 becomes conducting placing a load on the voltage doubling rectifier arrangement 102 and preventing a further rise in the positive biasing voltage supplied to the control electrode 78 of tube 79. Moreover, this variation in positive biasing voltage should not vary linearly over the kilovolt range, but desirably follows a curve approximating the shape of the radiation absorption curve.

This may be more fully appreciated by reference to Fig. 11 wherein the curve A represents the correction voltage to follow exactly the radiation absorption curve of the cassette 12 and its contents at various kilovoltage settings, whereas the curve B shows the variation in biasing voltage which varies from about −40 volts to +50 volts, thus illustrating that below approximately 60 kilovolts and down to about 40 kilovolts, the resultant biasing voltage is predominantly negative, whereas at above approximately 60 kilovolts the resultant biasing voltage becomes more and more positive until a maximum of about +50 volts is reached. This point is proportional to approximately 105 kvp., when the voltage regulator tube V1 becomes conductive at the knee of the absorption curve, as indicated by the legend "V1 Fires" in Fig. 11, and the resultant biasing voltage is prevented from rising further, as previously mentioned. This operation is governed by the proper selection of values of the resistors 87, 103 and 104 and which values also must so regulate the resultant biasing voltage that the electronic discharge tube 79 does not immediately become conductive.

Assuming now that these resistors 87 and 104 have been properly set and it is desired to take an exposure, the roentgenologist closes the "on" switch 113. Closure of this switch energizes the windings of relays 97 and 67 through a circuit extending from the line conductor 72, switch 113, conductor 114, contactor 108 of relay 95 which now engages contact terminal 107, and thence by means of conductor 115 to the winding of relay 67 and back to supply line conductor 73, to thus energize relay 67 with its contact 66 closing the circuit to the primary winding 64 of the high tension transformer 65. The secondary winding 68 accordingly energizes the X-ray tube 53 through the rectifier arrangement 69, and the X-ray beam from the tube is projected through the object 52, casing 9 and cassette 12 to expose the film within the latter, as well as the primary radiation passing through the radiation traps 38 and 39, accompanied by visible light from the fluorescent screens 40 being concentrated by the light collector 35 and projected upon the photomultiplier tube 32.

Simultaneously with energization of relay 67, the relay 97 is likewise energized, since its winding is connected at the junction 117 to conductor 114 and thus to supply line 72, and by means of conductor 116 to supply line 73. Relay 97 accordingly raises its contacts 110 and 112, with contact 110 thus disengaging contact terminal 109 and removing the short-circuiting of capacitor 75, while contact 112 engages contact terminal 96 to mechanically condition the plate circuit for electronic discharge tube 79 to energize relay 95 when the tube 79 becomes conductive, since at the moment it is non-conductive due to the resultant biasing voltage impressed upon its control electrode 78, as previously explained.

As the light falling on the photomultiplier tube 32 is proportional to the intensity of the primary radiation falling on the fluorescent screens 40, after passage through the film 48 within the cassette 12, the photomultiplier tube passes a current directly proportional to such light which flows through a circuit extending from the "phototube supply" 70, through conductor 41 to the photomultiplier tube 32, and back through conductor 33, resistor 74, charging capacitor 75 through resistor 76 to ground, thus back to the "photo-tube supply" 70 by means of ground connection G for the latter. Conductor 31 in conjunction with conductor 41 forms the circuit for supplying a potential to the anodes of the photomultiplier tube 32. The capacitor 75 is accordingly charged at a rate proportional to the light falling on the photo-multiplier tube with such capacitor impressing a negative bias on the control electrode 78 of electronic discharge tube 79 augmenting the resultant biasing potential impressed thereon from the previously mentioned positive and negative biasing sources including the transformers 83 and 99.

When the capacitor 75 is accordingly charged to a potential which is set by regulation of the photomultiplier tube to correspond to a desired film density (or intensity of visible light from fluorescent screens 40), the capacitor will discharge across the gap between the control electrode 78 and the cathode 80 of tube 79 to ground and from ground through resistor 76 to the positive plate of the capacitor 75. Such discharge of capacitor 75 causes tube 79 to immediately become conductive which thus completes an energizing circuit from one end of tertiary transformer winding 92 through rectifier 93 and resistor 94, winding of relay 95 to contact terminal 96 now engaged by relay contactor 112, through the anode-cathode space of tube 79 to ground and from the latter back to the opposite end of the tertiary winding 92.

Relay 95 is thus immediately energized with attendant disengagement of its contactor 108 from contact terminal 107 interrupting the circuit to the winding of relay 67 causing deenergization so that the contactor 108 engages the contact terminal 106 to complete a circuit to the signal alarm 118 thus indicating to the operator that the exposure is completed whereupon switch 113 is opened to condition the system for another exposure by disconnecting the coil of relay 97. Deenergization of relay 67 opens the circuit to the primary winding 64, causing a cessation in the generation of X-rays and the simultaneous deenergization of relay 97 causes the contact to reengage the contact terminal 109 and again short-circuit the capacitor 75, thus completely dissipating its charge preparatory to a recharging thereof.

Although the various elements of the automatic exposure control portion of the present system, as shown in Fig. 10, may be placed at the control panel or any other desirable place on the equipment, it has been found convenient to enclose the various elements included within the dotted line area of Fig. 10 entirely within the scanner-head or housing 22.

From the foregoing, it should thus become obvious to those skilled in the art that an exposure monitor for cassette changers is herein provided wherein uniformity of film density is assured regardless of changes in kilovoltage settings for patients or objects of different thicknesses. Moreover, the monitor of the present invention is subject to the control of the visible image as produced by only the primary X-radiations, since the fluorescent screen upon which the image is cast is completely shielded from secondary X-radiations.

Although one specific embodiment of the present invention is herein shown and described, it will be understood that other modifications thereof may be made without departing from the spirit and scope of the appended claims.

We claim:

1. An X-ray apparatus for the making of radiographic exposures comprising a casing provided with sections pervious and impervious to X-rays, a film-holding cassette movable longitudinally of said casing to position an exposed film back of an X-ray impervious section and an unexposed film in back of the X-ray pervious section of said casing, a housing positioned rearwardly of said casing in radial alignment with the pervious section thereof, a photosensitive pick-up tube carried by said housing, a light collector in said housing including a fluorescent screen on which a visible image is cast upon impingement of said screen by X-rays passing through an object and the X-ray pervious section of said casing and an optical arrangement for concentrating the visible light from said fluorescent screen on to the photosensitive pick-up tube; and an X-ray impervious cover for said housing adjacent the rear surface of said casing including a scatter-trap pervious to only primary radiations from said X-ray tube and for preventing secondary radiations from impinging upon said fluorescent screen.

2. An X-ray apparatus for the making of radiographic exposures comprising a casing provided with sections pervious and impervious to X-rays, a film-holding cassette movable longitudinally of said casing to position an exposed film back of an X-ray impervious section and an unexposed film in back of the X-ray pervious section of said casing, a pivoted housing positioned rearwardly of said casing in radial alignment with the pervious section thereof, a photosensitive pick-up tube carried by said housing, a light collector in said housing including a fluorescent screen on which a visible image is cast upon impingement of said screen by X-rays passing through an object and the X-ray pervious section of said casing and an optical arrangement for concentrating the visible light from said fluorescent screen on to the photosensitive pick-up tube; an X-ray impervious cover for said housing adjacent the rear surface of said casing including spaced scatter-traps pervious to only primary radiations from said X-ray tube and for preventing secondary radiations from impinging upon said fluorescent screen, and a control lever carried by said casing and movable into registration with indicia corresponding to various areas of the human body and operable to cause rotation of said pivoted housing to align said scatter traps with the area of the human body and photographic film within said cassette corresponding to the areas as selected by said control lever.

3. An X-ray apparatus for the making of radiographic exposures comprising a casing provided with sections pervious and impervious to X-rays, a film-holding cassette movable longitudinally of said casing to position an exposed film back of an X-ray impervious section and an unexposed film in back of the X-ray pervious section of said casing, a pivoted housing positioned rearwardly of said casing in radial alignment with the pervious section thereof, a photosensitive pick-up tube carried by said housing, a light collector in said housing including a fluorescent screen on which a visible image is cast upon impingement of said screen by X-rays passing through an object and the X-ray pervious section of said casing and an optical arrangement for concentrating the visible light from said fluorescent screen on to the photosensitive pick-up tube; an X-ray impervious cover for said housing adjacent the rear surface of said casing, and spaced scatter-traps carried by the X-ray impervious cover for said housing comprising alternate strips of X-ray pervious and impervious material having their widest dimension in alignment with the axis of the X-ray beam and pervious to only primary radiations from said X-ray tube by preventing secondary radiations from impinging upon said fluorescent screen.

4. An X-ray apparatus for the making of radiographic exposures comprising a casing provided with sections pervious and impervious to X-rays, a film-holding cassette movable longitudinally of said casing to position an exposed film back of an X-ray impervious section and an unexposed film in back of the X-ray pervious section of said casing, a pivoted housing positioned rearwardly of said casing in radial alignment with the pervious section thereof, a photosensitive pick-up tube carried by said housing, a light collector in said housing including a fluorescent screen on which a visible image is cast upon impingement of said screen by X-rays passing through an object and the X-ray pervious section of said casing and an optical arrangement for concentrating the visible light from said fluorescent screen on to the photosensitive pick-up tube; an X-ray impervious cover for said housing adjacent the rear surface of said casing, spaced scatter-traps carried by the X-ray impervious cover for said housing comprising alternate strips of X-ray pervious and impervious material having their widest dimension in alignment with the axis of the X-ray beam and pervious to only primary radiations from said X-ray tube by preventing secondary radiations from impinging upon said fluorescent screen, and a control lever carried by said casing and movable into registration with indicia corresponding to various areas of the human body and operable to cause rotation of pivoted housing to align said scatter traps with the area of the human body and the photographic film within said cassette corresponding to the areas as selected by said control lever.

5. An X-ray apparatus for the making of radiographic exposures comprising a casing provided with sections pervious and impervious to X-rays, a film-holding cassette movable longitudinally of said casing to position an exposed film back of an X-ray impervious section and an unexposed film in back of the X-ray pervious section of said casing, a pivoted housing positioned rearwardly of said casing in radial alignment with the pervious section thereof, a photosensitive pick-up tube carried by said housing, a light collector in said housing including a fluorescent screen on which a visible image is cast upon impingement of said screen by X-rays passing through an object and the X-ray pervious section of said casing and a pyramidal-shaped lens having a slightly flattened end adjacent the photosensitive pick-up tube for concentrating the visible light from said fluorescent screen on to said photosensitive pick-up tube; an X-ray impervious cover for said housing adjacent the rear surface of said casing including spaced scatter-traps pervious to only primary radiations from said X-ray tube by preventing secondary radiations from impinging upon said fluorescent screen, and a control lever carried by said casing and movable into registration with indicia corresponding to various areas of the human body and operable to cause rotation of said pivoted housing to align said scatter traps with the area of the human body and photographic film within said cassette corresponding to the areas as selected by said control lever.

ZANE L. COLLINS.
FREDERICK J. EULER, Jr.

References Cited in the file of this patent

UNITED STATES PATENTS

| Number | Name | Date |
| --- | --- | --- |
| 2,401,288 | Morgan et al. | May 28, 1946 |
| 2,401,289 | Morgan et al. | May 28, 1946 |
| 2,486,866 | Morgan et al. | Nov. 1, 1949 |
| 2,488,315 | Morgan et al. | Nov. 15, 1949 |
| 2,550,610 | Smith et al. | Apr. 24, 1951 |
| 2,583,132 | Alter et al. | Jan. 22, 1952 |